(12) United States Patent
Kamikawa et al.

(10) Patent No.: US 10,852,243 B2
(45) Date of Patent: Dec. 1, 2020

(54) APPARATUS FOR INSPECTING OBJECT SURFACE

(71) Applicant: Kabushiki Kaisha Toshiba, Tokyo (JP)

(72) Inventors: Takahiro Kamikawa, Tokyo (JP); Hiroshi Ohno, Kanagawa (JP); Takehiro Hato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 9 days.

(21) Appl. No.: 16/120,551

(22) Filed: Sep. 4, 2018

(65) Prior Publication Data

US 2019/0219515 A1    Jul. 18, 2019

(30) Foreign Application Priority Data

Jan. 15, 2018  (JP) ................................ 2018-004536

(51) Int. Cl.
  *G01N 21/88*    (2006.01)
  *G01N 21/47*    (2006.01)

(52) U.S. Cl.
  CPC ......... *G01N 21/8806* (2013.01); *G01N 21/47* (2013.01); *G01N 2201/0636* (2013.01)

(58) Field of Classification Search
  CPC .... G01N 21/8806; G01N 21/88; G01N 21/17; G01N 21/47; G01N 21/55; G01N 21/57; G01N 21/9501; G01N 2201/0636; G02B 21/08; G02B 21/10; G02B 21/12;
  (Continued)

(56) References Cited

U.S. PATENT DOCUMENTS

| 4,062,623 A | * | 12/1977 | Suzuki | ...................... G03F 9/70 359/209.1 |
| 5,481,095 A | * | 1/1996 | Mitsuda | ............... G06K 9/2036 235/454 |
| 5,737,074 A | | 4/1998 | Haga et al. | |

(Continued)

FOREIGN PATENT DOCUMENTS

| JP | 2002-195956 A | 7/2002 |
| JP | 2007-199089 A | 8/2007 |
| JP | 2008-39750 A | 2/2008 |

OTHER PUBLICATIONS

Woodham, "Gradient and curvature from the photometric-stereo method, including local confidence estimation," J. Opt. Soc. Am. A (Nov. 1994), 11:3050-3068.

*Primary Examiner* — Christina A Riddle
(74) *Attorney, Agent, or Firm* — Finnegan, Henderson, Farabow, Garrett & Dunner, L.L.P.

(57) ABSTRACT

An apparatus for inspecting object surface according to an embodiment includes: an imaging device including an imaging area; an optical source; and a group of optical devices including a mirror and a lens, and causing a reflected light other than a regular reflection light from an object to be reflected by a mirror surface of the mirror, and to form an image in the imaging area of the imaging device through the lens, the regular reflection light being caused by a light incident to a surface of the object from the optical source, wherein the optical source, the mirror, the lens, and the imaging device are arranged in such a manner that the regular reflection light is not incident to the imaging area of the imaging device through the mirror and the lens.

4 Claims, 5 Drawing Sheets

(58) Field of Classification Search
CPC .. G02B 21/125; G02B 27/0988; G02B 27/10; G02B 27/106; G02B 27/14; G02B 27/144
USPC .......... 356/237.1–237.2, 445–448, 364–370, 356/600–601, 609, 611, 612, 625, 388, 356/391, 256; 359/838
See application file for complete search history.

(56) References Cited

U.S. PATENT DOCUMENTS

| | | | |
|---|---|---|---|
| 5,751,473 A * | 5/1998 | Runciman | G01S 3/784 250/332 |
| 6,084,670 A | 7/2000 | Yamazaki et al. | |
| 2004/0263783 A1* | 12/2004 | Neal | G01B 11/306 351/221 |
| 2019/0162647 A1* | 5/2019 | Unlu | G02B 21/361 |

\* cited by examiner

APPARATUS FOR INSPECTING OBJECT SURFACE

CROSS REFERENCE TO RELATED APPLICATIONS

This application is based upon and claims the benefit of priority from the prior Japanese Patent Application No. 2018-004536, filed on Jan. 15, 2018, the entire contents of which are incorporated herein by reference.

FIELD

Embodiments described herein relate generally to apparatuses for inspecting object surface.

BACKGROUND

A surface inspection apparatus using magnetic characteristics or optical characteristics is well known as an apparatus for inspecting an object surface without contact. The surface inspection apparatus using the optical characteristics generally utilizes reflecting features or transparent features. It is important to extract scattering light including information of object surface nature when inspecting the object surface by utilizing the optical features.

In a conventional surface inspection apparatus by utilizing the optical features, since a scattering light is mixed in a reflecting light from the object or a transparent light through the object, it is difficult to extract the scattering light and it is impossible to inspect the surface nature of the object with high accuracy.

DETAILED DESCRIPTION

An apparatus for inspecting object surface according to an embodiment includes: an imaging device including an imaging area; an optical source; and a group of optical devices including a mirror and a lens, and causing a reflected light other than a regular reflection light from an object to be reflected by a mirror surface of the mirror, and to form an image in the imaging area of the imaging device through the lens, the regular reflection light being caused by a light incident to a surface of the object from the optical source, wherein the optical source, the mirror, the lens, and the imaging device are arranged in such a manner that the regular reflection light is not incident to the imaging area of the imaging device through the mirror and the lens.

The following is a description of embodiments of the present invention, with reference to the accompanying drawings.

First Embodiment

Figure 1:
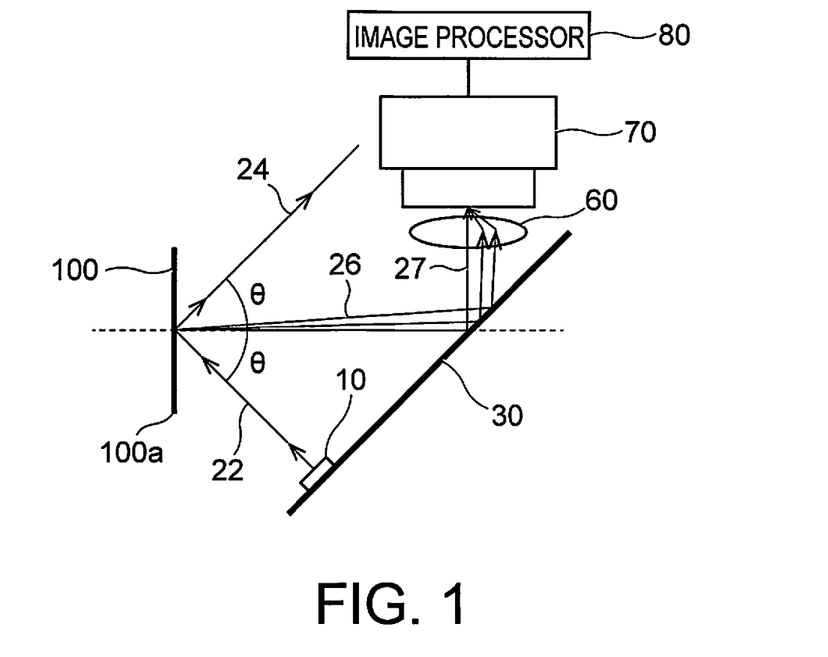
FIG. 1 is a diagram showing an apparatus for inspecting object surface according to a first embodiment.

FIG. 1 is a diagram showing an apparatus for inspecting object surface (herein after also referred to as a surface inspection apparatus) according to a first embodiment. The surface inspection apparatus of the first embodiment is an apparatus for inspecting a surface of an object 100, and includes an optical source 10, a mirror 30, a lens 60, an imaging device 70, and an image processing device (herein after also referred to as an image processor) 80. The optical source 10 is disposed at an end portion on a reflecting surface of the mirror 30.

The mirror 30 is disposed in such a manner that a mirror surface of the mirror 30 is oblique to a center axis of the object 100. The optical source 10 is disposed at an end portion on the mirror surface of the mirror 30 that is the nearest end portion to the object 100.

The lens 60 and the imaging device 70 are arranged in such a manner that an optical axis of the lens 60 coincides with a central axis of an imaging area (not shown) of the imaging device 70. The imaging area of the imaging device 70 includes photoelectric conversion elements that are arranged in a matrix form and convert a light to an electrical signal. The central axis of the imaging area means a line that passes through the center of the imaging area and is perpendicular to the imaging area.

The optical axis of the lens 60 intersects with a central axis of the object 100. The central axis of the object 100 means a line connecting a center of a first face to which a light is incident to a center of a second face opposed to the first face. The optical axis of the lens 30 is preferably arranged to be perpendicular to the central axis of the object 100. The mirror 30 is preferably arranged in such a manner that the mirror surface of the mirror 30 is arranged to intersect with the center of the object 100 and the optical axis of the lens at an angle of 45 degrees respectively.

A light emitted from the optical source 10 becomes a light 22 incident to the object 100. After the light 22 is incident to the object 100, a part of the incident light 22 becomes a regular reflection light 24 by a reflection law, another part of the incident light 22 becomes a scattering light 26 depending on surface condition of the object 100. The regular reflection light 24 is a reflection light having a reflection angle that is equal to an incident angle of the incident light 22. The scattering light 26 is incident to the mirror surface of the mirror 30 and is reflected by the mirror surface. The light 27 reflected by the mirror surface (not shown) forms an image in the imaging area of the imaging device 70 through the lens 60. The image formed in the imaging area of the imaging device 70 is processed by the image processor 80, and it is possible to inspect an aspect of the surface condition of the object 100 and specify the object 100, and thereby obtaining the surface nature of the object 100. During inspecting, the object 100 may be fixed not to move, or may move along a direction perpendicular to the central axis of the object 100.

In the first embodiment, the optical source 10, the mirror 30, the lens 60, and the imaging device 70 are arranged in such a manner that the regular reflection light 24 of the incident light 22 incident to the object 100 from the optical source 10 is not incident to the imaging area of the imaging device 70 through the mirror 30 and the lens 60. In other words, the optical source 10, the mirror 30, the lens 60, and the imaging device 70 are arranged in such a manner that the regular reflection light 24 of the incident light 22 incident to an end portion 100a of the object 100 that is the nearest to the optical source 10 is not incident to the imaging area of the imaging device 70 through the mirror 30 and the lens 60.

In the first embodiment, a LED (Light-Emitting Diode) or the likes is preferably used as the optical source 10. A light emitted from the LED, a fiber optical source, an electric light bulb, or a fluorescent material and having various wave lengths may be used as the optical source 10. A CMOS (Complementary Metal-Oxide Semiconductor) sensor, a CCD (Charge-Coupled Device) or the likes may be used as the imaging device 70. And an imaging device that can detect the wavelength range of the optical source 10 may be used as the imaging device 70.

In the first embodiment, the optical source 10 is disposed at the end portion of the mirror surface of the mirror 30. If the regular reflection light 24 is not incident to the imaging area of the imaging device 70 through the mirror 30 and the lens 60, it is not necessary that the optical source 10 is disposed at the end portion of the mirror surface of the mirror 30. In other words, it is not necessary that the optical source 10 is in contact with the mirror surface of the mirror.

In the first embodiment, if the mirror 30 has one surface that is mirror surface and the mirror surface has a reflection features in which a light in a wavelength range of the optical source 10 can be reflected, the mirror surface may be a flat face or a concave face. In FIG. 1, the mirror surface is a flat face.

As described above, according to the first embodiment, since the surface inspection apparatus is constituted in such a manner that the scattering light 26 from the object 100 is incident to the imaging area of the imaging device 70 through the mirror 30 and the lens 60, but the regular reflection light 24 is not incident to the imaging area of the imaging device 70 through the mirror and the lens 60, it is possible to inspect the surface nature of the object 100 with accuracy.

Second Embodiment

Figure 2:
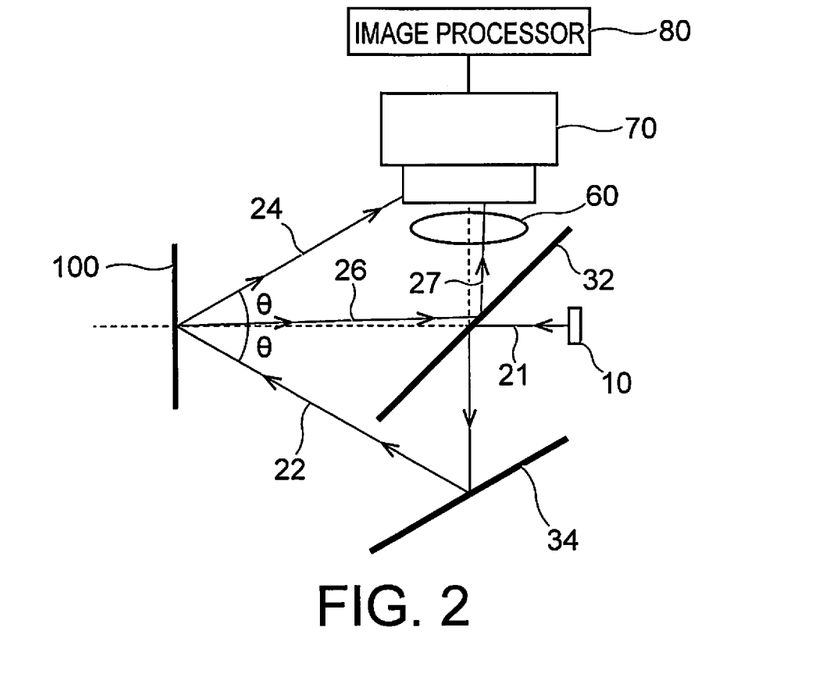
FIG. 2 is a diagram showing an apparatus for inspecting object surface according to a second embodiment.

FIG. 2 is a diagram showing an apparatus for inspecting object surface (herein after also referred to as a surface inspection apparatus) according to a second embodiment. The surface inspection apparatus of the second embodiment includes an optical source 10, a first mirror 32, a second mirror 34, a lens 60, an imaging device 70, and an image processor 80.

In the second embodiment, the optical source 10 is faced to the object. Therefore, an optical axis of a light emitted from the optical axis 10 is disposed to be parallel to a central axis of the object 100. The optical axis of a light emitted from the optical source 10 is also referred to as an optical axis of the optical source 10.

The optical axis of the lens 60 is arranged to coincide with the central axis of the imaging area (not shown) of the imaging device 70. The optical axis of the lens 60 and the central axis of the imaging area of the imaging device 70 are arranged to intersect with the central axis of the object 100, preferably be perpendicular to the central axis of the object 100.

The first mirror 32 is disposed between the optical source 10 and the object 100, and disposed between the imaging device 70 and the second mirror 34. The lens 60 is disposed between the imaging device 70 and the first mirror 32. The first mirror 32 is disposed to incline with respect to an optical axis of a light emitted from the optical source 10 and the central axis of the object 100 at a determined angle, for example, 45 degrees. The first mirror 32 includes a first mirror surface faced to the optical source 10 and a second mirror surface faced to the object 100. The first mirror surface faced to the optical source 10 may be a flat face or a concave face. When the first mirror surface is a concave face, for example, the concave face is a paraboloid, the optical source 10 is preferably disposed to a focal position. In this case, light rays reflected by the paraboloid become parallel and is incident to the second mirror 34.

The second mirror 34 reflects a light reflected by the first mirror surface of the first mirror 32 and causes the light reflected by the second mirror 34 to be incident to the object 100. The second mirror 34 is disposed to be inclined with respect to an optical axis of the light emitted from the optical source 10 and the central axis of the object 100 at determined angle.

The light 21 emitted from the optical source 10 is reflected by the first mirror surface of the first mirror 32, is incident to a mirror surface of the second mirror 34, and becomes an incident light 22 which is reflected by the mirror surface of the second mirror 34 and incident to the object 100. The incident light 22 is incident to the object 100, a part of the incident light 22 becomes a regular reflection light 24 by a reflection law, another part of the incident light 22 becomes a scattering light 26 depending on the surface condition of the object 100. The regular reflection light 24 is a reflection light having a reflection angle that is equal to an incident angle of the incident light 22. The scattering light 26 is incident to the second mirror surface of the first mirror 32 and is reflected by the second mirror surface. The light 27 reflected by the mirror surface (not shown) forms an image in the imaging area of the imaging device 70 through the lens 60. The image formed in the imaging area of the imaging device 70 is processed by the image processor 80, and it is possible to obtain the surface nature of the object 100.

Figure 3:
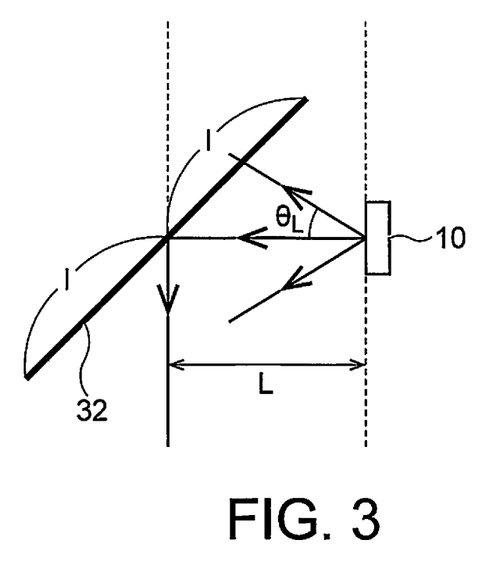
FIG. 3 is a diagram showing an example of a preferred arrangement of the apparatus for inspecting object surface according to the second embodiment.

In the second embodiment, in order to prevent a light emitted from the optical source 10 from being directly incident to the imaging device 70, as shown in FIG. 3, let L be a distance between the optical source 10 and a point at which the optical axis of the optical source 10 intersects with the first mirror 32, and let 2l be a length of the first mirror surface of the first mirror 32, the following relational expression is satisfied.

$$L \leq \frac{\ell}{\sqrt{2}}\left\{1 + \frac{1}{\tan(\sin^{-1} NA)}\right\}$$

NA denotes a numerical aperture of the optical source, and satisfies the equation "NA=sin $\theta_L$". $\theta_L$ denotes the maximum angle that is an angle of a light beam incident to the first mirror surface of the first mirror 32 from the optical source 10 with respect to the optical axis of the optical source 10 and is a maximum.

However, the intensity of the scattering light 26 detected by the imaging device 70 may be stronger than that of the regular reflection light 24 without satisfying above described expression. In this case, the image processor 80 conducts proper processes thereby performing functions for inspecting object surface.

A light emitted from the LED, a fiber optical source, an electric light bulb, or a fluorescent material and having various wavelengths may be used as the optical source 10. For example, a CMOS sensor, a CCD or the likes may be used as the imaging device 70. And an imaging device that can detect the light having the wavelength range of the optical source 10 may be used as the imaging device 70.

In the second embodiment, the optical source 10, the first mirror 32, the second mirror 34, the lens 60, and the imaging device 70 are arranged in such a manner that the regular reflection light 24 of the incident light 22 incident to the object 100 from the optical source 10 is not incident to the imaging area of the imaging device 70 through the second mirror surface of the first mirror 32 and the lens 60. In other words, the optical source 10, the first mirror 32, the second mirror 34, the lens 60, and the imaging device 70 are arranged in such a manner that the regular reflection light 24 of the incident light 22 incident to an end portion 100a of the object 100 that is the nearest to the second mirror 34 is not incident to the imaging area of the imaging device 70 through the second mirror surface of the first mirror 32 and the lens 60.

As described above, according to the second embodiment, since the surface inspection apparatus is constituted in such a manner that the scattering light 26 from the object 100 is incident to the imaging area of the imaging device 70 through the second mirror surface of the first mirror 32 and the lens 60, but the regular reflection light 24 is not incident to the imaging area of the imaging device 70 through the second mirror surface of the first mirror 32 and the lens 60, it is possible to inspect the surface nature of the object 100 with accuracy.

Third Embodiment

Figure 4:
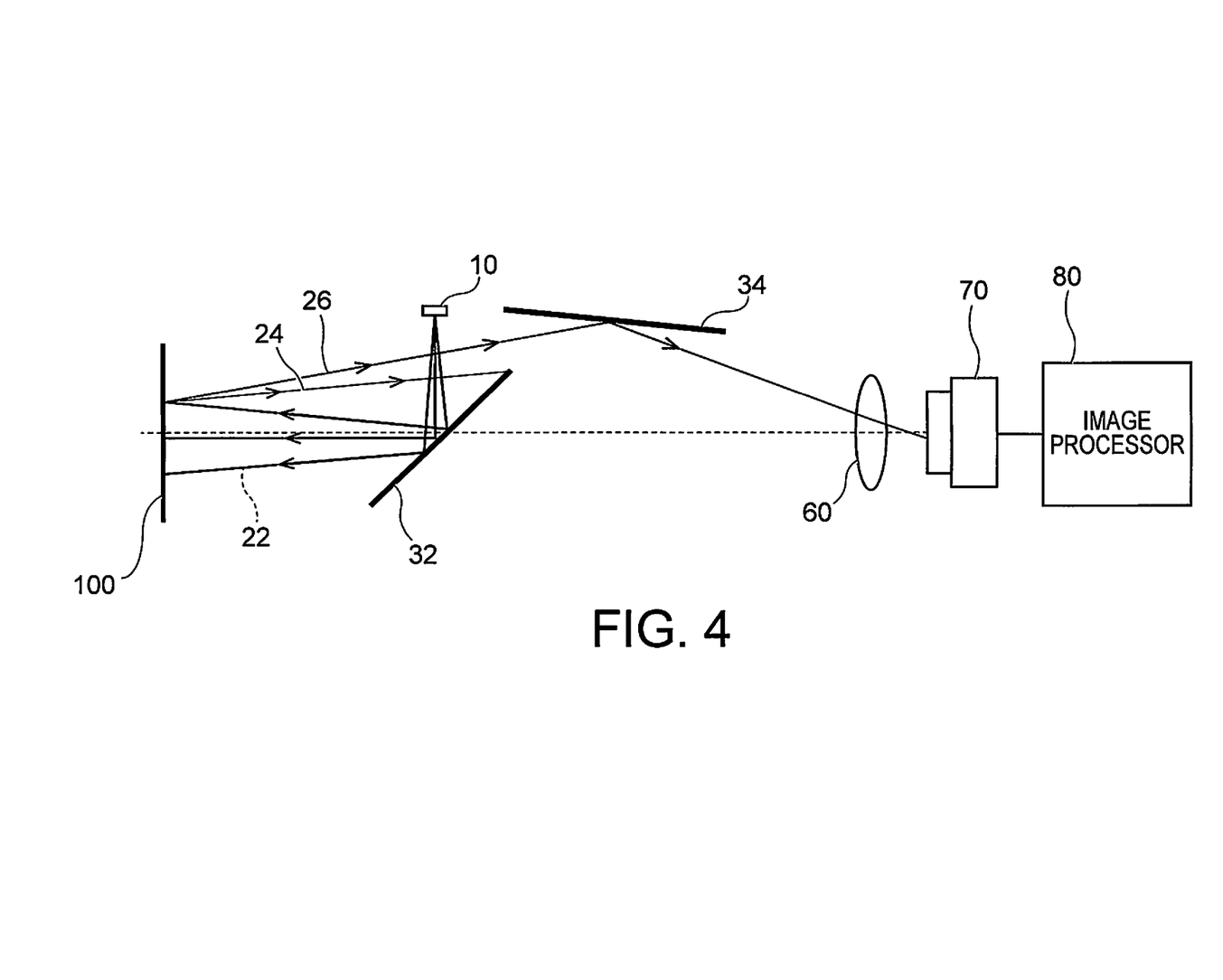
FIG. 4 is a diagram showing an apparatus for inspecting object surface according to a third embodiment.

FIG. 4 is a diagram showing an apparatus for inspecting object surface (herein after also referred to as a surface inspection apparatus) according to a third embodiment. The surface inspection apparatus of the third embodiment has the same configuration as the surface inspection apparatus of the second embodiment except that the disposition of the optical source 10 and the dispositions of the lens 60 and the imaging device 70 are interchanged. Therefore, the disposition of the second mirror 34 is different from that in the second embodiment. In other words, the optical axis of the lens 60 is arranged to coincide with the central axis of the imaging area (not shown) of the imaging device 70, and the optical axis of the lens 60 and the central axis of the imaging area of the imaging device 70 are arranged to be parallel to the central axis of the object 100. The optical axis of the optical source 10, or a central axis of a light emitted from the optical source 10 is arranged to intersect with the optical axis of the lens 60 and the central axis of the imaging area of the imaging device 70, preferably intersect with the optical axis of the lens 60 and the central axis of the imaging area of the imaging device 70 at an angle of 90 degrees.

The first mirror 32 is disposed between the object 100 and the imaging device 70, and the lens 60 is disposed between the first mirror 32 and the imaging device 70. The first mirror 32 is disposed to incline with respect to the optical axis of the lens and the central axis of the imaging area of the imaging device 70, and also incline with the optical axis of the optical source 10. The first mirror 32 reflects a light emitted from the optical source 10 and causes a light reflected by the first mirror 32 to be incident to the object 100.

The second mirror 34 is disposed in such a manner that the light emitted from the optical source 10 is reflected by the first mirror 32, becomes an light incident to the object 100, a scattering light 26 of the light incident to the object 100 is reflected by the second mirror 34 and incident to the imaging area of the imaging device 70. Therefore, the second mirror 34 is disposed between the first mirror 32 and the lens 60, and disposed on a side of the optical source 10 (an upper side with respect to the central axis of the object 100 in FIG. 4) with respect to the optical axis of the lens 60.

Next operations of the surface inspection apparatus according to the third embodiment will be described.

A light emitted from the optical source 10 is reflected by the first mirror 32 and is incident to the object 100. The imaging device 70 is disposed in such a manner that most of the regular reflection light 24 in the light reflected by the object 100 is reflected by the first mirror 32, and is not incident to the imaging device 70. In particular, the imaging device 70 is faced to the object 100, and is disposed on a back side of the first mirror 32. A scattering light in the light reflected by the object 100 is reflected by the second mirror 34 and forms an image in a imaging area (not shown) of the imaging device 70 through the lens 60. The image formed by the imaging device 70 is processed by the image processor 80, thereby being able to inspect an aspect of the surface condition of the object 100 and specify the object 100, and obtain the surface nature of the object 100. The object 100 is formed of material reflecting light, for example, paper, metal, cloth, or the likes.

As described above, according to the third embodiment, since the surface inspection apparatus is constituted in such a manner that the scattering light 26 from the object 100 is reflected by the second mirror 34 and is incident to the imaging area of the imaging device 70 through the lens 60, but most of the regular reflection light 24 is reflected by the first mirror 32, it is possible to inspect the surface nature of the object 100 with accuracy.

Fourth Embodiment

Figure 5:
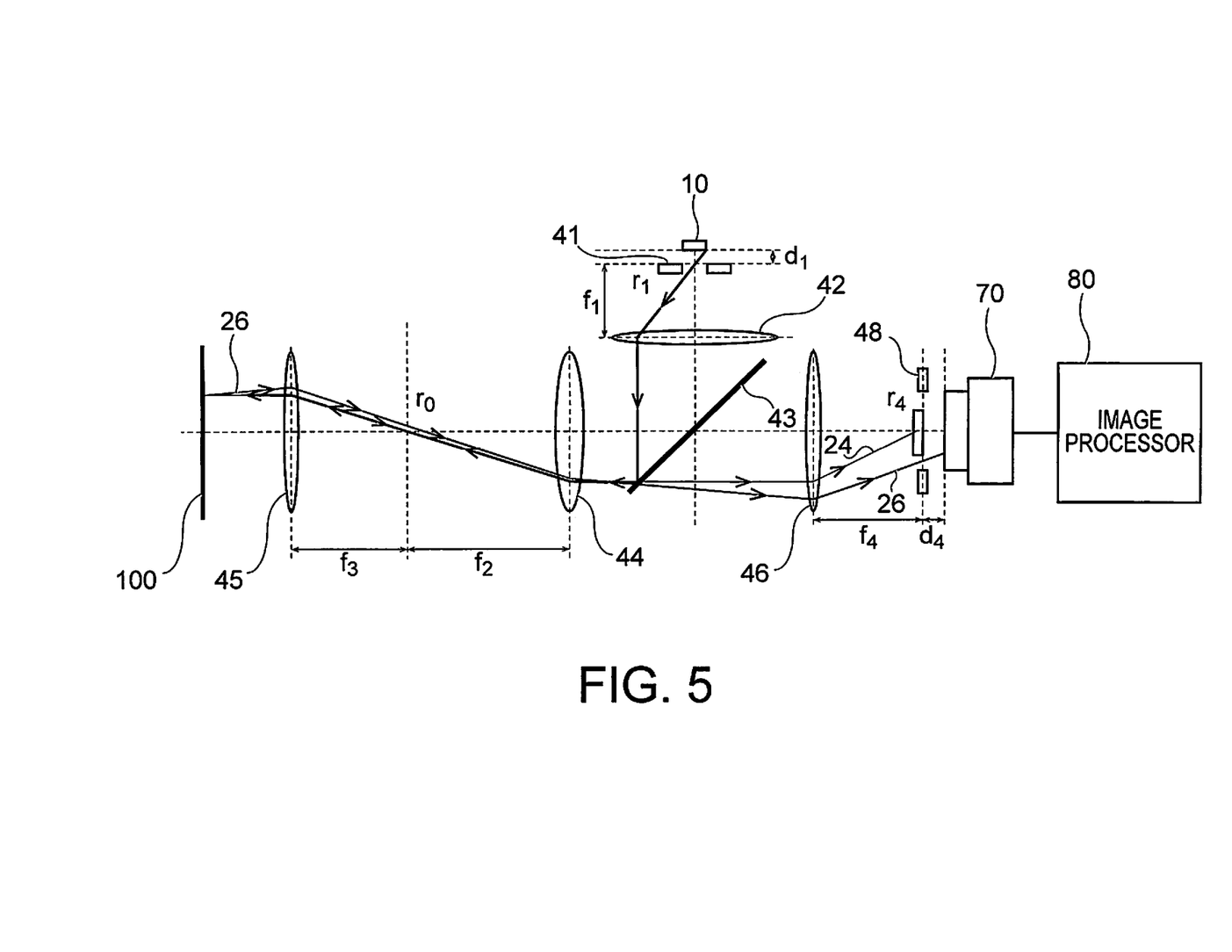
FIG. 5 is a diagram showing an apparatus for inspecting object surface according to a fourth embodiment.

FIG. 5 is a diagram showing an apparatus for inspecting object surface (herein after also referred to as a surface inspection apparatus) according to a fourth embodiment. The surface inspection apparatus of the fourth embodiment is an apparatus for inspecting a surface of an object 100, and includes an optical source 10, a partial transmission device 41, a lens 42, a half mirror 43, a lens 44, a lens 45, a lens 46, a partial transmission device 48, an imaging device 70, and an image processor 80.

The partial transmission device 41 has an aperture of which a radius is $r_1$ in a central portion, and is disposed to be separated from the optical source 10 at a distance of $d_1$. The partial transmission device 41 and the optical source 10 are disposed in such a manner that an optical axis of a light emitted from the optical source 10 coincides with a central axis through the aperture of the partial transmission device 41. The lens 42 is disposed to separate from the partial transmission device 41 at a focal length $f_1$ of the lens 42.

The lens 44 is disposed between the lens 45 and the lens 46, their lenses 44, 45, 46 have a common optical axis. The optical axis of the lens 44, the lens 45, and the lens 46 intersect with the optical axis of the optical source 10. The optical axis of the lens 44, the lens 45, and the lens 46 is preferably perpendicular to the optical axis of the optical source 10. The optical axis of the lens 44, the lens 45, and the lens 46 is preferably disposed to coincide with the central axis of the object 100 and the central axis of the imaging area (not shown) of the imaging device 70. The half mirror 43 is disposed between the lens 44 and the lens 46, and a mirror surface of the half mirror 43 intersects with the optical axis of the optical source 10 and the optical axis of the lens 44, the lens 45, and the lens 46. The half mirror 43 is preferably disposed in such a manner that the mirror surface of the half mirror 43 intersects with the optical axis of the optical source 10 and the optical axis of the lens 44, the lens 45, and the lens 46 at an angle of 45 degrees respectively.

A focal length of the lens 44 is $f_2$, a focal length of the lens 45 is $f_3$, and a focal length of the lens 46 is $f_4$. The lens 44, the lens 45, and the lens 46 are disposed in such a manner that a distance between the lens 44 and the lens 45 is equal to $f_2+f_3$, and a distance between the lens 44 and the lens 46 is equal to $f_2+f_4$.

The imaging device 70 is disposed on one side of the lens 46 opposite from the lens 44. The partial transmission device 48 is disposed between the lens 46 and the imaging device 70 and at a position where a distance from the lens 46 is equal to the focal length $f_4$. The partial transmission device 48 has a structure in which a light interception portion having a disk shape of which a radius is $r_4$ is disposed in a central portion. The partial transmission device 48 is disposed at a position where a distance from the imaging area of the imaging device 70 is equal to $d_4$.

A light emitted from the optical source 10 is narrowed by the aperture of the partial transmission device 41, and then collimated by the lens 42. In other words, the partial transmission device 41 is disposed at a focal point of the lens 42. The light that is collimated by the lens 42 is reflected by the half mirror 43, and conducted to the lens 44. The light passing through the lens 44 is incident to the object 100 through the lens 45. At that time, a telecentric optical system where a light is incident to a whole surface of the object 100 at the same incident angle occurs. The regular reflection light 24 from the object 100 passes through the lens 45, the lens 44, and the half mirror 43, and is focused by the lens 46. Since the partial transmission device 48 has the light interception portion at the central portion, the light is transmitted through an outer portion of the partial transmission device.

Depending on surface aspects of the object 100, the scattering light 26 from the object 100 may be scattered in a specific direction different from a direction in which the regular reflection light 24 transmits. Therefore, the scattering light 26 transmits through the partial transmission device 48 and forms an image at the imaging area of the imaging device 70. The image obtained by the imaging device 70 is processed by the image processor, thereby being able to inspect the surface of the object 100.

In the fourth embodiment, the partial transmission device 41 has a transmission portion of which a radius is $r_4$ at the central portion of the partial transmission device 41. The light interception portion of the partial transmission device 48 has a disk shape of which a radius is $r_4$, it is desirable to satisfy the following relationship. The light passing through the central portion of the partial transmission device 41 is caused to form an image having a size of a radius $r_0$ at a position of the focal length $f_3$ by the lens 45 as shown in FIG. 5. On a side of the optical source 10, an enlargement factor of the object 100 is $f_1/f_2$, a radius $r_1$ of the aperture of the partial transmission device 41 is equal to $r_0 \times f_1/f_2$. On a side of the imaging device 70, an enlargement factor of the object 100 is $f_4/f_2$, a radius $r_4$ of the light interception portion of the partial transmission device 48 is equal to $r_0 \times f_4/f_2$. Therefore, the radii and the focal lengths of the partial transmission device 41 and 48 are satisfied the following relational expression.

$$r_1 \cdot r_4 = f_1 \cdot f_4$$

A light emitted from the LED, a fiber optical source, an electric light bulb, or a fluorescent material and having various wavelengths may be used as the optical source 10. A CMOS (Complementary Metal-Oxide Semiconductor) sensor, a CCD (Charge-Coupled Device) or the likes may be used as the imaging device 70. And an imaging device that can detect the light having the wavelength range of the optical source 10 may be used as the imaging device 70. The half mirror may have a shape of a flat plate or a cube.

As described above, according to the fourth embodiment, since the surface inspection apparatus is constituted in such a manner that the regular reflection light 24 from the object 100 is emitted to the light interception portion of the partial transmission device 48 and a part of the scattering light 26 is emitted to portions other than the light interception portion of the partial transmission device 48, it is possible that the scattering light is separated from the regular reflection light, thereby being able to inspect the surface nature of the object 100 with accuracy.

The scattering light may have large wavelength dependence. In this case, it is possible to effectively extract the scattering light by selecting a proper wavelength region in the imaging device.

Fifth Embodiment

Figure 6:
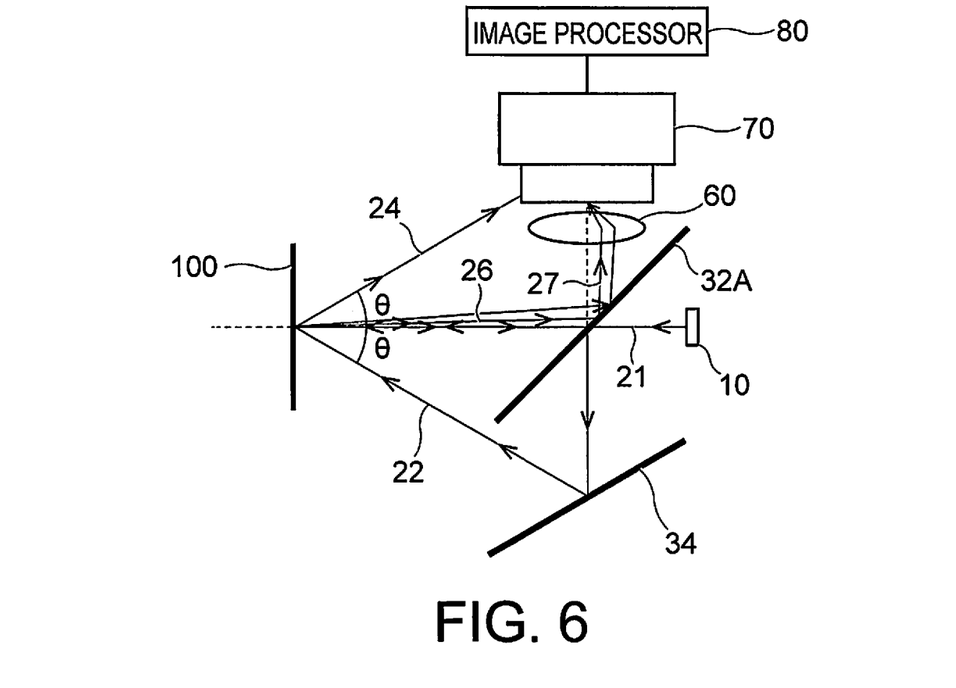
FIG. 6 is a diagram showing an apparatus for inspecting object surface according to a fifth embodiment.

FIG. 6 is a diagram showing an apparatus for inspecting object surface (herein after also referred to as a surface inspection apparatus) according to a fifth embodiment. The surface inspection apparatus of the fifth embodiment has the same configuration as the surface inspection apparatus of the second embodiment shown in FIG. 2 except that the first mirror 32 is replaced with a half mirror 32A.

In the fifth embodiment, a part of the light 21 emitted from the optical source 10 is reflected by the half mirror 32A, and incident to the second mirror 34. Another part of the light 21 emitted from the optical source 10 passes through the half mirror 32A and is incident to the object 100. The light incident to the object 100 is reflected by the object 100 and becomes the regular reflection light 25 and the scattering light 26. The scattering light 26 is incident to the imaging area of the imaging device 70 through a mirror surface of the half mirror 32A and the lens 60. A light incident to the second mirror 34 is reflected by the second mirror 34 and becomes a light 22 incident to the object 100. A behavior of the light 22 is the same that described in the second embodiment.

As described above, like the second embodiment, in the fifth embodiment, since the surface inspection apparatus is constituted in such a manner that the scattering light 26 from the object 100 is incident to the imaging area of the imaging device 70 through the mirror surface of the half mirror 32A and the lens 60, but the regular reflection light 24 is not incident to the imaging area of the imaging device 70 through the mirror surface of the half mirror 32A and the lens 60, it is possible to inspect the surface nature of the object 100 with accuracy.

In the fifth embodiment, the half mirror 32A may be disposed to be perpendicular to the optical axis of the optical source 10. In this case, the second mirror 34 is discarded.

Sixth Embodiment

Figure 7:
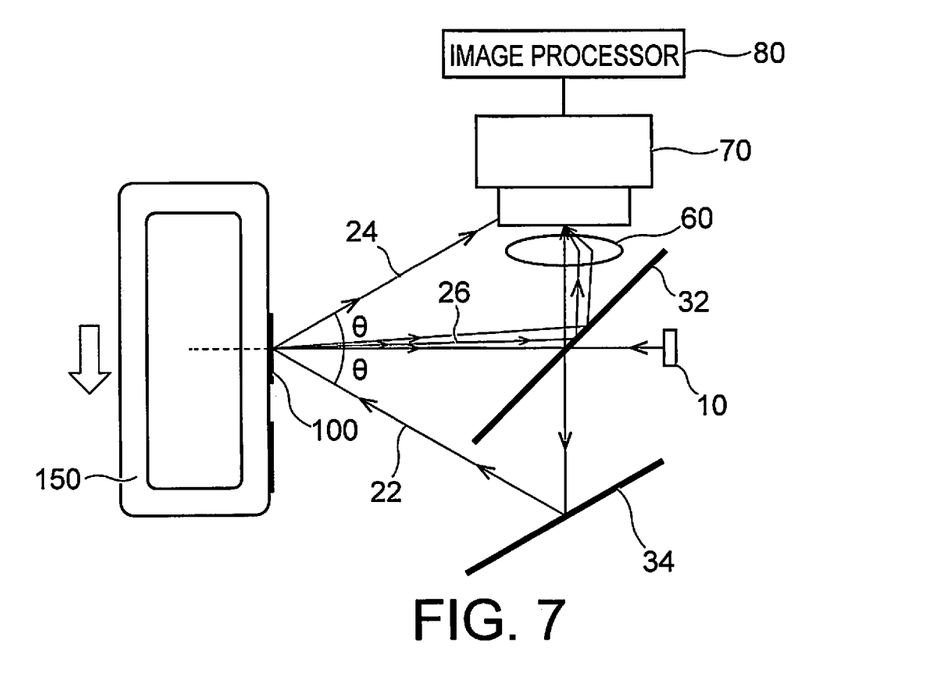
FIG. 7 is a diagram showing an apparatus for inspecting object surface according to a sixth embodiment.

FIG. 7 is a diagram showing an apparatus for inspecting object surface (herein after also referred to as a surface inspection apparatus) according to a sixth embodiment. The surface inspection apparatus of the sixth embodiment has the same configuration as the surface inspection apparatus of the second embodiment shown in FIG. 2 except that the object 100 is disposed along a delivering path 150. In other words, the object 100 is moved along the delivering path 150.

In the sixth embodiment, like the second embodiment, since the surface inspection apparatus is constituted in such a manner that the scattering light 26 from the object 100 is incident to the imaging area of the imaging device 70 through the second mirror surface of the first mirror 32 and the lens 60, but the regular reflection light 24 is not incident to the imaging area of the imaging device 70 through the second mirror surface of the first mirror 32 and the lens 60, it is possible to inspect the surface nature of the object 100 with accuracy.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An apparatus for inspecting an object surface comprising:
   an imaging device including an imaging area;
   an optical source;
   a first partial transmission device including a transmission portion in a central part, a part of a light emitted from the optical source passing through the transmission portion;
   a second partial transmission device including a light interception portion in a central part;
   a first lens disposed on one side of the first partial transmission device opposite from the optical source;
   a second lens, a third lens, and a fourth lens having a common optical axis, the second lens being disposed between the third lens and the fourth lens, an optical axis of the first lens intersecting with a line connecting a center of the second lens to a center of the fourth lens; and
   a half mirror disposed between the second lens and the fourth lens; wherein:
      the first lens is disposed separate from the first partial transmission device at a focal length of the first lens;
      the half mirror reflects a light from the first lens and propagates the light to the second lens;
      the second lens propagates the light propagated from the half mirror to the third lens;
      the third lens causes the light propagated from the second lens to be incident to a surface of an object and propagates a light reflected at the surface of the object to the second lens;
      the second lens propagates the light reflected at the surface to the half mirror;
      the half mirror passes the light propagated from the second lens and propagates the light to the fourth lens;
      the fourth lens causes the light propagated from half mirror to form an image in the imaging area of the imaging device through the second partial transmission device; and
      the light interception portion of the second partial transmission device blocks a regular reflection light in the light reflected at the surface of the object.

2. The apparatus according to claim 1, wherein:
   a distance between the second lens and the third lens is equal to a sum of a focal length of the second lens and a focal length of the third lens;
   a distance between the second lens and the fourth lens is equal to a sum of the focal length of the second lens and a focal length of the fourth lens; and
   a distance between the fourth lens and the second partial transmission device is equal to the focal length of the fourth lens.

3. The apparatus according to claim 1, wherein:
   $f_1$ denotes a focal length of the first lens;
   $f_4$ denotes a focal length of the fourth lens;
   $r_1$ denotes a radius of the transmission portion of the first partial transmission device;
   $r_4$ denotes a radius of the light interception portion of the second partial transmission device; and
   the following relationship expression is satisfied:

$$r_1 : r_4 = f_1 : f_4.$$

4. The apparatus according to claim 1, further comprising an image processor that obtains a surface information of the object based on the image formed by the imaging device.

* * * * *